United States Patent
Roach et al.

(10) Patent No.: US 9,545,767 B2
(45) Date of Patent: Jan. 17, 2017

(54) PERMANENT MARKING OF MOLDED RUBBER PRODUCTS

(75) Inventors: Eric Roach, North Oaks, MN (US); Peter C. Baker, Minneapolis, MN (US)

(73) Assignee: Computype, Inc., St. Paul, MN (US)

( * ) Notice: Subject to any disclaimer, the term of this patent is extended or adjusted under 35 U.S.C. 154(b) by 1265 days.

(21) Appl. No.: 11/041,902

(22) Filed: Jan. 24, 2005

(65) Prior Publication Data
US 2006/0162846 A1    Jul. 27, 2006

(51) Int. Cl.
| | | |
|---|---|---|
| *B60C 13/00* | (2006.01) | |
| *B29C 59/00* | (2006.01) | |
| *B29D 30/00* | (2006.01) | |
| B29D 30/06 | (2006.01) | |
| B32B 3/30 | (2006.01) | |
| B32B 38/06 | (2006.01) | |
| B29C 59/02 | (2006.01) | |
| B29B 17/02 | (2006.01) | |
| B29D 30/72 | (2006.01) | |
| B29L 30/00 | (2006.01) | |

(52) U.S. Cl.
CPC ........... *B29D 30/0061* (2013.01); *B29B 17/02* (2013.01); *B29B 2017/0279* (2013.01); *B29C 59/00* (2013.01); *B29C 59/022* (2013.01); *B29D 2030/061* (2013.01); *B29D 2030/726* (2013.01); *B29L 2030/00* (2013.01); *B32B 3/30* (2013.01); *B32B 38/06* (2013.01); *B60C 13/001* (2013.04); *Y02W 30/622* (2015.05); *Y02W 30/68* (2015.05)

(58) Field of Classification Search
CPC ............... B29D 30/0061; B29D 2030/0612; B29D 2030/726; B60C 13/00; B60C 13/001; B32B 3/30; B32B 38/06; Y10T 156/1023; B29C 59/00; B29C 59/002; B29C 59/02; B29C 59/021; B29C 59/022; B29C 59/026; B29C 43/021; B29C 2043/023
USPC ........ 156/116, 123, 219, 220, 277; 152/523, 152/524
See application file for complete search history.

(56) References Cited

U.S. PATENT DOCUMENTS

| | | | |
|---|---|---|---|
| 1,989,703 A * | 2/1935 | Leguillon | 152/523 |
| 2,139,068 A * | 12/1938 | Bourdon | 428/207 |
| 2,955,052 A * | 10/1960 | Carlson et al. | 430/121.1 |
| 2,984,596 A * | 5/1961 | Franer | 428/41.6 |
| 3,236,025 A | 2/1966 | Wien | |
| 4,010,354 A | 3/1977 | Apicella, Jr. et al. | |
| 4,991,217 A | 2/1991 | Garrett et al. | |
| 5,160,383 A | 11/1992 | Gartland et al. | |
| 5,254,302 A | 10/1993 | Yamanaka | |

(Continued)

FOREIGN PATENT DOCUMENTS

| | | | |
|---|---|---|---|
| JP | 01-011824 A | * | 1/1989 |
| WO | WO-2006081197 A2 | | 8/2006 |
| WO | WO-2006081197 A3 | | 8/2006 |

*Primary Examiner* — Geoffrey L Knable
(74) *Attorney, Agent, or Firm* — Schwegman Lundberg & Woessner, P.A.

(57) ABSTRACT

One embodiment of the invention includes a method for imparting a unique identifier to a molded polymeric article. The method includes providing a label comprising indicia having a thickness effective for embossing the polymeric article during molding and a melting point greater than the melting point of the molded polymeric article. The method also includes attaching the label to the article prior to vulcanization. The method further includes vulcanizing the article so that indicia emboss the molded polymeric article by forming indentations in the molded polymeric article.

8 Claims, 2 Drawing Sheets

(56) References Cited

U.S. PATENT DOCUMENTS

| | | | |
|---|---|---|---|
| 5,358,772 A | 10/1994 | Nakagawa et al. | |
| 5,527,407 A | 6/1996 | Gartland et al. | |
| 5,709,918 A | 1/1998 | Kimijima et al. | |
| 6,287,684 B1 | 9/2001 | Yamanaka et al. | |
| 6,576,325 B1 | 6/2003 | Yamanaka et al. | |
| 6,656,551 B1 * | 12/2003 | Dyl | 428/36.8 |
| 6,764,804 B2 | 7/2004 | Bourdelais et al. | |

* cited by examiner

PERMANENT MARKING OF MOLDED RUBBER PRODUCTS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to any software and data as described below and in the drawings that form a part of this document: Copyright 2004, CompuType, Inc. All Rights Reserved.

FIELD

Embodiments described herein refer to methods of permanently marking molded rubber products using a label and articles made by the methods.

BACKGROUND

In 2000, the National Highway Traffic Safety Administration (NHSTA) required automobile manufacturers to recall thousands of tires because of accidents allegedly resulting from tire tread separation. Suspect tires were traced back through the tire manufacturer's quality records. However, no records existed in the vehicle chassis assembly process to link tires' serial numbers to the vehicle identification number (VIN). Legislation passed by Congress and the Department of Transportation now requires automobile manufacturers to implement a tracking system to link the tires' serial numbers and VIN. Additionally, tire and automobile manufacturers have been encouraged to implement a more reliable and accurate method of tracking the DOT code, tire serial numbers, size, type, date, manufacturing plant, and mold machine for every tire and to tie this information to the VIN.

The tire recalls were massive because no data existed as to which tire lots and/or tire manufacturing dates had been installed on specific vehicles. Tire manufacturers had been relying upon hand stamping tires with lot and date codes using indelible ink or using raised bar code symbols directly embossed or molded into the surface of a tire to track and identify tires. However, the low data density of these systems prevented them from incorporating the required data storage volume. The molding technology increased tire manufacturing costs while limiting flexibility for incorporating on-demand variable data.

Other technologies providing high-density machine readable data include U.S. Pat. No. 4,991,217 which describes a passive radio frequency identification transponder tag which is interrogated by a radio frequency field from outside of the tire. This radio frequency identification is susceptible to radio wave interference and damage from vulcanization heat/pressure during the tire's manufacturing/tag mounting process.

U.S. Pat. No. 5,160,383 discloses a tire label permanently mounted to an inner liner of the tire for tracking of the tire's serial numbers throughout the entire life of the tire up to and including retreading of the tire. The label is manufactured using a SPBD/rubber blend which is permanently affixed to the inside of the tire where it is cured along with the tire in a mold by the heat and pressure of the vulcanization curing process. Mounted on the inside of the tire, the label is only readable when the tire casing has been removed from the tire rim. U.S. Pat. No. 4,010,354 discloses a magnetically encodable tag in a sequential tape format that is encoded with tire's identifying data which is applied to the side wall material of a green tire. The magnetically encoded tape and associated encoding and decoding equipment increase the tire costs.

The use of magnetically encodable tags in tape format written sequentially with tire identifying data and applied to the sidewall material of a green tire is described in U.S. Pat. No. 4,010,354. The encoded data is readable from the tire at any point in the tire's manufacturing process and the signals indicative of the tire's identification number are converted to an alphanumeric display and/or fed to a process control computer for on-line quality assurance and control or stored as a recorded history of the tire manufacturing process for inventory control.

The use of a resin based film type substrate used for a tire's production control label is described in U.S. Pat. No. 5,709,918. The label surface is printed with a bar code and a pressure sensitive adhesive layer is formed via a primer layer on the back side of the label surface. The printing does not become blurred or erased under the high temperatures and high pressures during vulcanization.

An apparatus and method for supplying a graphic label that is readable with a light scanning device when the label placed on a rubber article such as a tire is described in U.S. Pat. No. 5,527,407. The graphic bar code label is optically interpreted by a bar code reader. Printing is applied using thermal transfer techniques.

A label is designed to be disposed on an unvulcanized raw rubber tire and then fixed to the finished tire by vulcanization using heat and pressure is described in U.S. Pat. No. 5,358,772. The indication label has a label base material with a heat-resistant plastic film and an abrasive surface coating layer formed on the upper surface of the plastic film. The abrasive surface includes a hardened resin and filler. An indication defined by an ink layer is disposed on the abrasive surface. A rubber adhesive laminated on the lower surface of the plastic film adheres the label to the tire. The label is constructed by forming the ink layer on the exterior side of the abrasive surface coating layer. The abrasive surface has a profile and roughness for preserving the quality of the indication.

Current label designs for labeling tires use conformable films such as biaxially oriented polypropylene (BOPP) or polyolefins (blends of polypropylene and polyethylene) for the label face stock. These films conform well to a tire surface, but as the tire ages there are components within the rubber compounds that bleed and migrate to the surface and interact with the label's film. Migration is also a problem for tires exposed to elevated temperatures, for example within a trailer during storage/transportation during summer months. This migration of waxes, oils, lubricants, plasticizers and other low molecular weight additives into the label adhesive and label film not only discolors the label but also impacts the adhesive bond of the label film, making it weaker and likely to lift or flag.

SUMMARY

Figure 1A:
FIG. 1A illustrates a label embodiment of the invention, in a cross-sectional view before molding and vulcanization of the label on a polymeric article.

One embodiment of the invention includes a method for imparting a unique identifier to a molded polymeric article for identifying the article. The identifier includes indicia that are embossed into the molded polymeric article. The identifier also includes a label, having indicia, wherein the label is adhered to the molded polymeric article. The indicia on the label are used to emboss the molded polymeric article.

The method includes providing a label comprising a substrate and indicia, wherein the indicia have a thickness or height above the substrate and hardness, effective for embossing the polymeric article during molding. The indicia on the label have a melting point greater than the melting point of the molded polymeric article. The method also includes attaching the label to the article prior to vulcanization or other type of heating and pressure treatment. The method further includes vulcanizing or, for some embodiments, heating the article under pressure so that indicia emboss the molded polymeric article by forming indentations in the molded polymeric article. As a result, the molded polymeric article has indicia formed by the indentations made by ink on the label that are embossed into the molded polymeric article and indicia on the label, which is adhered to the molded polymeric article.

Another embodiment includes a label. The label includes a substrate, an adhesive adhered to the substrate, the adhesive capable of becoming a part of a molded polymeric article; and indicia on the substrate, the indicia having a height and a hardness effective for forming a permanent impression into the molded polymeric article.

One other embodiment includes a molded polymeric article that includes a label having a substrate, an adhesive adhered to the substrate, the adhesive capable of becoming a part of a molded polymeric article. The label also includes indicia having a height and a hardness effective for forming a permanent impression into the molded polymeric article. The molded polymeric article also includes embossed indicia formed by the ink indicia on the label.

DETAILED DESCRIPTION

Methods, apparatus and systems for permanent marking of molded rubber products are described herein. In the following description, numerous specific details are set forth. However, it is understood that embodiments of the invention may be practiced without these specific details. In other instances, well-known circuits, processes, structures, and techniques have not been shown in detail in order to avoid obscuring the understanding of this description. Note that in the description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the invention described herein may include any variety of combinations and/or integrations of the embodiments described herein. Moreover, in this description, the phrase "exemplary embodiment" means that the embodiment being referred to serves as an example or illustration.

One embodiment of the invention described herein includes a method for imparting a unique identifier system to a molded polymeric article. The unique identifier system marks the molded polymeric article in two locations on the article, using two types of marks, an embossed mark and a mark on a label. The method includes providing a label having a substrate and indicia applied to the substrate wherein the indicia have a thickness and height above the substrate that is effective for embossing the polymeric article during molding.

One embodiment of the label is illustrated in cross section at 10 in FIG. 1A. The label includes a substrate 12, indicia 18 on a surface of the substrate 12, the indicia made with a hard ink. The indicia 18 have a melting point that is greater than the melting point of the molded polymeric article. The indicia remain hard and intact when exposed to elevated temperatures and pressures, such as occur during vulcanization of rubber. In one embodiment, ultraviolet-cured printing inks are used to make the indicia 18. A top plan view of the label, shown in FIG. 2, also shows the indicia 18.

The ultraviolet-cured printing inks are applied to the substrate using methods that include inkjet printing and silk screen printing. Silk screen printing is used to print indicia that do not change from one article to another. Ink jet printing is used to print indicia that change from one article to another. One molded polymeric article embodiment is illustrated at 16 in FIGS. 1A, 1B and 1C and 2A, 2B and 2C.

The label shown in FIGS. 1A, 1B, 1C, 2A, 2B, and 2C includes a clear substrate 12 having indicia extending to a height above the adhesive 20. In another embodiment, shown at 30 in FIGS. 3A, 3B and 3C, the label 30 includes an opaque substrate 32, an adhesive layer 34 that adheres to rubber 36 of a molded polymeric article. The label 30 also includes indicia 38 on a surface of the opaque substrate that opposes the adhesive 34. When the label is subjected to vulcanization, the indicia 38 are pressed into the polymeric article, and form indentations shown at 40 in FIG. 3C. The indentations correspond to the indicia and provide information imparted by the indicia even if the label is removed.

Method embodiments also include attaching the label to the article prior to heating and pressurizing the article in a process such as vulcanization. While vulcanization is described, it is understood that other temperature and pressure-based molding processes, such as thermoplastic molding, and thermoset molding are also usable in the method described herein.

Figure 1B:
FIG. 1B illustrates the label embodiment of FIG. 1A, in cross-sectional view, after molding and vulcanization of the label on a polymeric article.
Figure 1C:
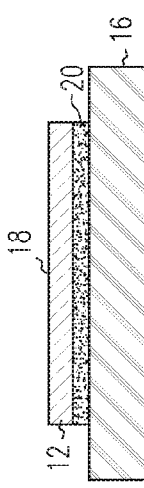
FIG. 1C illustrates the label embodiment of FIG. 1C, in cross-sectional view, when the label is removed from the polymeric article.

Method embodiments further include heating and pressurizing, which in some embodiments, includes vulcanizing the article so that indicia emboss the molded polymeric article by forming indentations in the molded polymeric article. With the method embodiment, molded polymeric articles, such as tires, are marked with two sets of indicia. The articles are marked with indicia that are on the label that is applied to the article. The articles are also marked with an embossed impression of either the indicia on the label or an inverse image of the indicia when hardened ink forming indicia on the label is pressed into the polymeric material of the article, as shown in FIG. 1B. With the method embodiments described herein, the article is rendered identifiable and traceable even when the label is lost or destroyed, as is shown in FIG. 1C, because label indicia are embossed into the article itself.

Label embodiments include a face stock, also referred to herein as the substrate, an adhesive for adhering to the molded polymeric article, and hard ink indicia for providing label information and for embossing the information into the molded polymeric article. The label face stock is required to be sturdy enough to withstand the manufacturing and assembly environment of the molded polymeric article. For some embodiments, the label face stock is clear. For other embodiments, the label face stock is opaque. The label face stock embodiments are capable of withstanding environments that include warehouse storage, handling, shipping, trailers, conveyors, soaping, wheel mounting equipment, inflation, balancing, and load simulator operations and equipment environments. Because mounting machines and load simulation equipment contact the side walls of molded polymeric articles such as tires and thus the label, the label is subject to severe stress. The label face stock embodiments are resistant to tearing, abrasion, staining, oil, heat, moisture, plasticizers, and UVB exposure.

Label face stock embodiments are between 0.001 inches and 0.008 inches thick formed out of, for example, a polyester label film, polyethylene napthalate, polypropylene, polyurethane, polyethylene, polystyrene, polycarbonate, polyolefin, polyamide, acetate, acrylic, acrylar, vinyl, polyvinyl fluoride, Tedlar, Tyvek, Teflon, and/or synthetic paper. For some embodiments, film stiffness of the label face stock ranges between 20 and 80 mg (Gurley). This stiffness produces good dispensing properties for self-stripping the label from the release liner on a label-dispensing unit, yet enables the label to be flexible enough to conform to the curvature of a tire sidewall. The label face stock has, for some embodiments, lay-flat properties to reduce label creasing and wrinkling and to prevent the dry-pull tab from lifting or folding back over the bar code symbol.

Figure 2A:
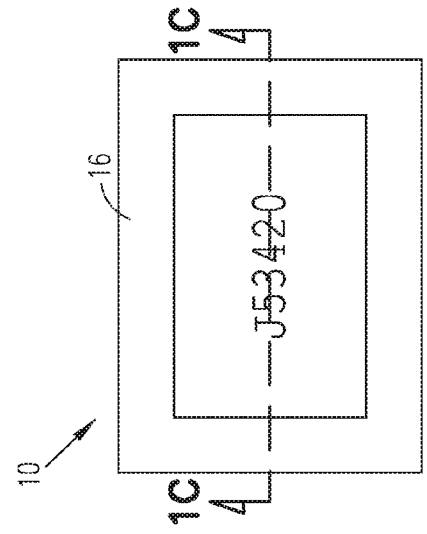
FIG. 2A illustrates a top plan view of the label of FIG. 1A, before molding and vulcanization.
Figure 2B:
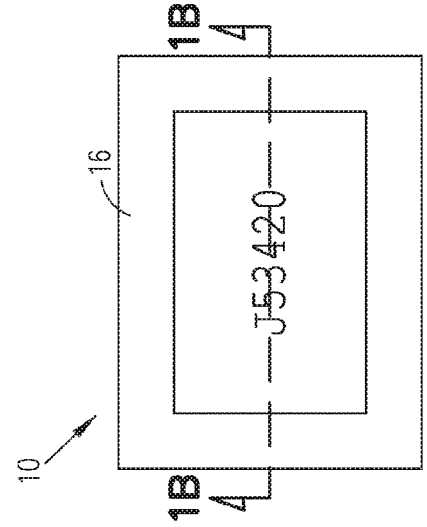
FIG. 2B illustrates a top plan view of the label of FIG. 2B, after molding and vulcanization.
Figure 2C:
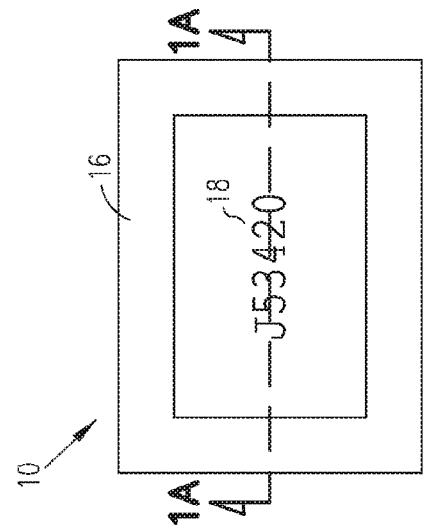
FIG. 2C illustrates a top plan view of the label of FIG. 2C, after the label is removed.
Figure 3A:
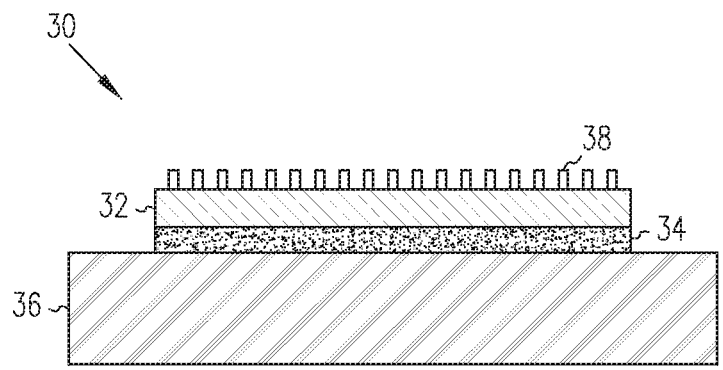
FIG. 3A illustrates a cross-sectional view of another label embodiment before molding and vulcanization.
Figure 3B:
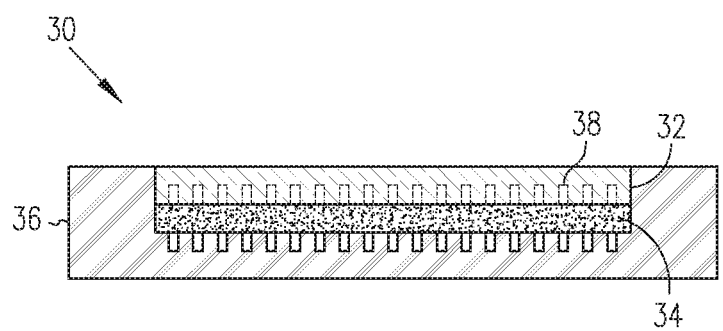
FIG. 3B illustrates a cross-sectional view of the label embodiment of FIG. 3A after molding and vulcanization.
Figure 3C:
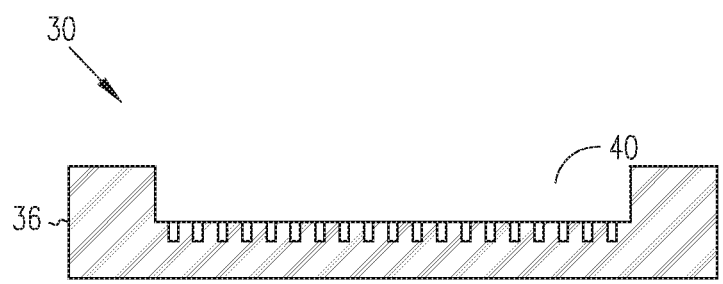
FIG. 3C illustrates a cross-sectional view of the label embodiment of FIG. 3A after the label is removed.

Configuring the label 10 as shown in one embodiment in FIGS. 2A, 2B and 2C, allows sufficient printable area to place, for some embodiments, a 2D machine-readable symbology and an ascii serial number thereon as shown in FIG. 2. While machine-readable symbology and ascii numbers are described, it is understood that any type of indicia is usable in embodiments of the label described herein. The indicia may be readable by humans, machines or both. The label 10 dimensions are selected to be small enough so that the label 10 fits onto a smooth space available on the sidewall of any size/brand of the tire.

For some embodiments the label is configured with an adhesive area 20 and an area that promotes easy removal of the label 10 once the tire has been mounted onto a vehicle and the data thereon has been scanned and assigned to the VIN database for that vehicle. For this embodiment, even though the label is removed, a portion for some embodiments and all for other embodiments of the data remains on the tire as an image embossed into the tire.

In one embodiment, orienting the label 10 at the center of the tire allows the label to be subjected to increased sideways shear from the tire mounting, tire inflation and/or load simulation equipment which may be contacting the tire side wall. For other embodiments the label is positioned on a sidewall of the tire or within a bead area of the tire. For some embodiments, the label is not visible once the tire has been mounted on a rim. While specific label locations are described, it is understood that the label may be positioned anywhere on a tire.

The label adhesive 20 is, for some embodiments, a pressure sensitive rubber based adhesive coated in a thickness of between 0.001 and 0.004 inches. The adhesive bond is strong between the label and the tire side wall, yet, for some embodiments, removable after the final wheel/vehicle carriage assembly, if desired. The adhesive is selected to resist the migration of plasticizer and other low-molecular weight additives within the rubber tire compound as the tire ages or becomes exposed to elevated temperatures, for example within a trailer during storage/transportation during summer months.

The label 10 is printed using, for some embodiments the hard ink described herein and an ink jet printer. For other embodiments, the label is printed with silk screen printing. For other embodiments, the label is printed using both ink jet printing and silk screen printing. For some embodiments, a clear protective over laminate film or overprint varnish is used, to resist abrasion of the label printed indicia.

What is claimed is:

1. A method for imparting a unique identifier to a molded polymeric article, comprising:
    providing a label having a front surface and an opposite back surface, the label comprising indicia having a thickness effective for embossing the polymeric article, the indicia including indicia projections projecting upward away from the front surface of the label, the indicia imparted by ink having a melting point greater than a vulcanization temperature of the molded polymeric article;
    attaching the back surface of the label to the polymeric article prior to vulcanization with an adhesive at a location wherein a user of the molded polymeric article can view the label indicia; and
    vulcanizing the polymeric article while pressing the indicia to emboss the molded polymeric article to form indentations corresponding to the indicia projections in the polymeric article so that the polymeric article is marked with both the indicia of the label and the indentations formed in the polymeric article wherein indicia are viewable by a user of the polymeric article if the overlying label is lost or destroyed.

2. The method of claim 1 wherein the indentations of the indicia remain when the label is destroyed.

3. The method of claim 1 wherein the adhesive becomes part of the polymeric article.

4. The method of claim 1 wherein the label is opaque.

5. The method of claim 1 wherein the indicia on the label are made with a hard ink.

6. A molded polymeric article having the indicia made by the method of claim 1.

7. A tire comprising the indicia made by the method of claim 1.

8. A vehicle that includes one or more tires having the indicia made by the method of claim 1.

* * * * *

UNITED STATES PATENT AND TRADEMARK OFFICE
CERTIFICATE OF CORRECTION

| | |
|---|---|
| PATENT NO. | : 9,545,767 B2 |
| APPLICATION NO. | : 11/041902 |
| DATED | : January 17, 2017 |
| INVENTOR(S) | : Roach et al. |

It is certified that error appears in the above-identified patent and that said Letters Patent is hereby corrected as shown below:

In the Specification

In Column 5, Line 29, delete "napthalate," and insert --naphthalate,-- therefor

Signed and Sealed this
Tenth Day of April, 2018

Andrei Iancu
*Director of the United States Patent and Trademark Office*